United States Patent [19]
Dolan

[11] Patent Number: 5,117,312
[45] Date of Patent: May 26, 1992

[54] APPARATUS INCLUDING CONCAVE REFLECTORS AND A LINE OF OPTICAL FIBERS

[75] Inventor: James T. Dolan, Frederick, Md.

[73] Assignee: Fusion Systems Corporation, Rockville, Md.

[21] Appl. No.: 637,019

[22] Filed: Jan. 4, 1991

[51] Int. Cl.⁵ .................. G02B 17/06; G02B 5/10; F21V 7/08; F21V 7/12
[52] U.S. Cl. ........................... 359/858; 362/32; 362/298; 385/901
[58] Field of Search ............ 350/619, 96.18; 362/32, 362/298

[56] References Cited

U.S. PATENT DOCUMENTS

| | | | |
|---|---|---|---|
| 4,498,029 | 2/1985 | Yoshizawa et al. | 315/111.21 |
| 4,710,638 | 12/1987 | Wood | 350/619 |
| 4,739,152 | 4/1988 | Downs | 362/248 |
| 4,792,692 | 12/1988 | Herold et al. | |
| 4,850,669 | 7/1989 | Welker et al. | |
| 4,860,172 | 8/1989 | Schlager et al. | 350/96.15 |
| 4,871,249 | 10/1989 | Watson | 350/619 |
| 4,883,333 | 11/1989 | Yanez | 362/32 |
| 4,922,385 | 5/1990 | Awai | 362/32 |
| 4,945,455 | 7/1990 | Akizuki | 362/298 |
| 4,950,059 | 8/1990 | Roberts | |

FOREIGN PATENT DOCUMENTS

| | | | |
|---|---|---|---|
| 747917 | 10/1944 | Fed. Rep. of Germany | 350/619 |
| 68801 | 4/1982 | Japan | 350/619 |

Primary Examiner—Jon W. Henry
Attorney, Agent, or Firm—Pollock, Vande Sande & Priddy

[57] ABSTRACT

An optical system comprising reflectors of elliptical and circular cross section for efficiently coupling radiation from a large scale radiation source such as a light bulb into an optical fiber bundle.

4 Claims, 4 Drawing Sheets

APPARATUS INCLUDING CONCAVE REFLECTORS AND A LINE OF OPTICAL FIBERS

BACKGROUND OF THE INVENTION

There is a need to couple optical radiation from large scale, high power sources into optical fibers. The radiation may be infra red, ultra violet, or visible light.

Optical fibers are used to conduct light to spaces which can not be directly viewed. For example, the inside of a hazardous material tank or internal regions of the human body would be viewed in this way. Optical fibers may also be used to conduct light to remote areas of a large liquid crystal display.

A high power optical radiation source is generally some kind of discharge lamp such as a microwave excited discharge lamp or an arc lamp. Discharge lamps can supply hundreds to thousands of watts of radiation. High power radiation is necessary for some applications for which it is desirable to use optical fibers as a means of conducting the light. Arc lamps emit in all directions, albeit not equally, except for the directions blocked by the electrodes and related structure. State of the art microwave lamps emit nearly equally in all directions. A microwave discharge lamp is disclosed in U.S. Pat. No. 4,485,332 to Ury et al.

Since the known radiation sources emit in a large percentage of the solid angle space, some kind of optical system must be used to redirect the radiation towards the end of the fiber into which it is desired to couple the light.

According to usual practice fibers are cut squarely at their ends. In order to couple radiation into a fiber it must be made to impinge the end of the fiber at an angle no greater than 5 to 40 (the exact value is a fiber specification that varies from one fiber to another) degrees from the normal to the end of the fiber.

This requirement of the angle incidence of the radiation places a second requirement on the optical system employed.

The prior art has not provided a way to couple a large percentage of the radiation from a large scale radiation source into an optical fiber economically.

U.S. Pat. No. 4,950,059 to Roberts discloses a bulb which is reflective over its surface except for a small window through which light passes into a light guide. The light coupled into the light guide is not especially angled, and therefore it is unlikely that a bundle of optical fibers could be used instead of a light guide.

U.S. Pat. No. 4,850,669 to Welker et al discloses a parabolic section reflector used to couple light from an electric powered light bulb to an optical fiber bundle. Only a fraction of the solid angle of light emanating from the lamp would be focused by the reflector.

U.S. Pat. No. 4,792,692 to Herold et al. discloses an elliptical reflector which is used to couple light into an optical waveguide. The optical system disclosed does not direct a large portion of the light emitted by the source, which light is wasted.

SUMMARY OF THE INVENTION

As used herein, the word "circular" shall mean a shape which is circular in cross section such as a circular cylinder or a sphere. The word "elliptical" shall mean a shape which is elliptical in cross section such as an elliptical cylinder or a prolate spheroid. The term "point-like" shall mean a source that emits from a small isometric volume. Examples are a spherical microwave discharge bulb and a compact arc lamp.

According to this invention, an elliptical reflector and a spherical or cylindrical reflector are juxtaposed in relation to a radiation source and optical fiber or fibers ends so as to achieve high efficiency of coupling between the source and the fibers.

According to one embodiment of this invention, a relatively small spherical radiation source is place at the focus of a reflector which is shaped like a truncated prolate spheroid. A prolate spheroid is a solid of revolution of an ellipse about its major axis. The reflector is truncated at such a position that the radiation that is reflected directly by the prolate spheroid reflector is incident on the fiber end at an angle equal or less than the maximum angle for coupling into the bulb. If the reflector were extended beyond the noted position, although the light reflected from the extended portion would be directed to the fiber, the angle of incidence of the light on the fiber would be greater than the maximum coupling angle.

The radiation which is emitted in directions so that it misses the prolate spheroid reflector is incident on a reflector shaped like a truncated sphere. The radiation from the spherical reflector is reflected through the radiation source and onto the prolate spheroid reflector, from which it is reflected onto the fiber end at a proper angle.

According to a second embodiment of the invention, a first reflector is shaped as a section of a cylinder of an ellipse. A second reflector is shaped as a section of a circular cylinder. The second reflector has a line of holes parallel to its axis, along its center. The ends of optical fibers are positioned in the holes. Both reflectors are reflective on their concave sides. The reflectors are set squarely facing each other. A linear radiation bulb is set at the focus of the elliptical reflector. The radius of the cylindrical reflector and its distance from the bulb are the same as the focus to focus distance of the elliptical reflector. In other words, the first focus of the elliptical reflector is the location of the bulb and the center of the circular reflector. The second focus of the elliptical reflector is at the line of holes in the circular cylinder reflector.

In operation, a portion of the radiation emitted from the linear radiation source is reflected by the elliptical reflector into the optical fibers. A second portions is reflected by the circular reflector through the bulb and onto the elliptical reflector and in turn into the optical fibers. The first and second portions of radiation account for nearly all of the radiation emitted by the radiation source.

In yet a third embodiment, a spherical reflector is joined to a prolate spheroid reflector. The prolate spheroid acts to directly focus radiation to an optical fiber bundle. The spherical reflector acts to gather radiation not directly focused by the prolate spheroid reflector and redirect it through a small spherical bulb to the prolate spheroid reflector from which it is focused on the end of the optical fiber bundle.

In certain microwave lamps the reflector also serves as part of the microwave cavity. U.S. Pat. No. 4,485,332 to Ury et al discloses such a lamp. The third embodiment is a reflector system according to this invention incorporated into a microwave lamp. Integral spherical and prolate spheroid reflectors are used as part of the cavity wall of the lamp.

DESCRIPTION OF THE PREFERRED EMBODIMENTS

Figure 1:
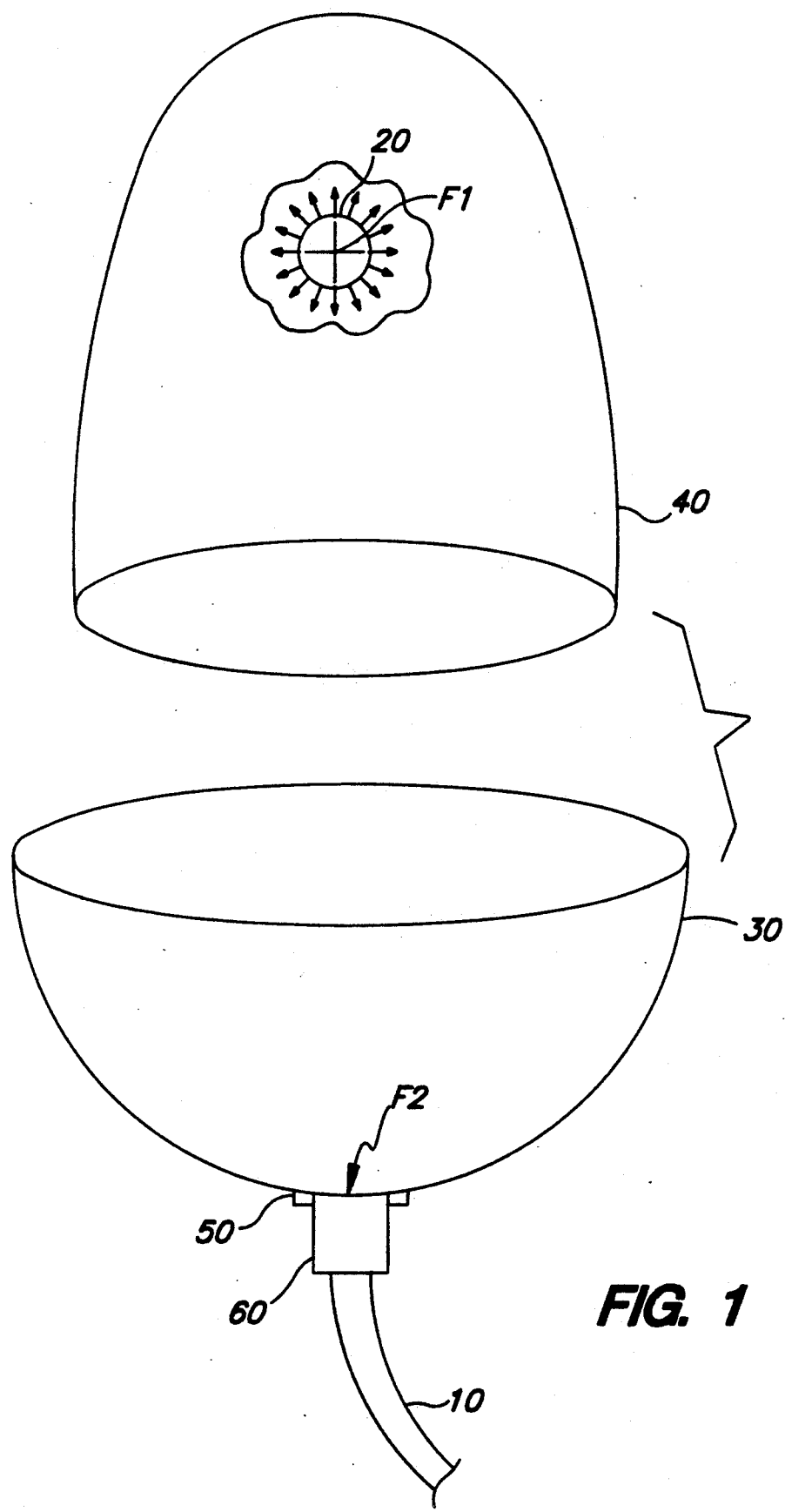
FIG. 1 is a pictorial view of a rotationally symmetric optical system according to this invention.

FIG. 1 depicts an embodiment of this invention. A lamp for coupling radiation into a bundle of optical fibers 10 is depicted.

The lamp is comprised of a small approximately spherical bulb 20, a spherical reflector 30, and a prolate spheroid reflector 40. The spherical reflector 30 includes a socket 50 for attaching a ferrule 60 of an optical fiber or preferably an optical fiber bundle 10.

The bulb is supported at the focus F1 of the prolate spheroid reflector which lies inside of the reflector. As noted below another focus F2 lies beyond the edge of the reflector. The bulb may be supported by standard means known in the art such as a glass stem (not depicted).

Figure 3:
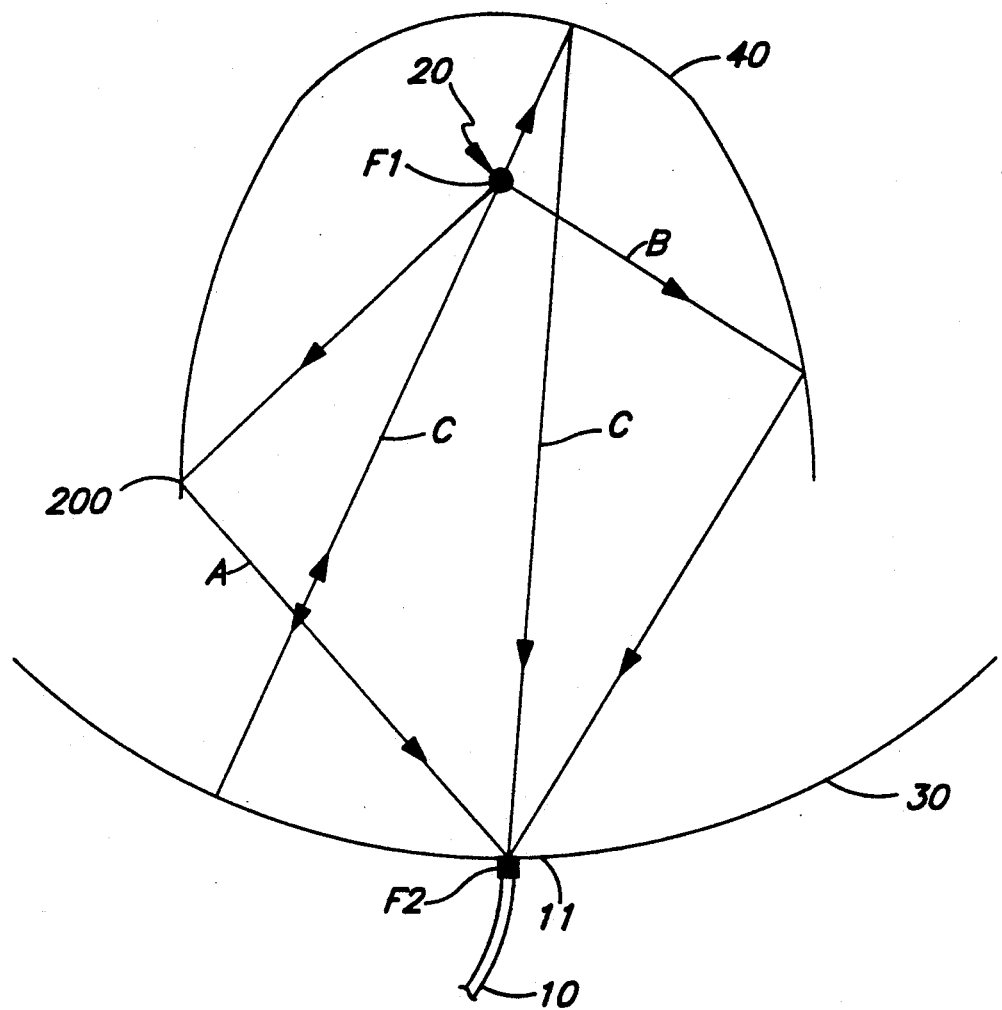
FIG. 3 is a cross section schematic of the optical systems of the embodiments of FIG. 1 and FIG. 2.

Referring to FIGS. 1 and 3, the spherical reflector 30 is positioned at a distance equal to its radius from the first focus F1 of the ellipsoidal reflector 40. Its radius also equals the distance between the first focus F1 and the second focus F2. The spherical reflector 30 includes a socket 50. The socket has a hole in its center that provides an opening between the inside of the spherical reflector and the outside. A ferrule 60 attached to the end of an optical fiber bundle 10 can be securely attached to the socket 50. The attachment between the ferrule 60 and the socket 50 can be a bayonet type of joint.

The radiation emitted by the bulb is either incident on the prolate spheroid reflector 40 or the spherical reflector 30. The radiation incident on the prolate spheroid reflector 40 is focused on the hole in the socket where the end of a optical fiber bundle 10 is positioned. The radiation which is incident on the spherical reflector 30 is reflected directly back along it original course. Thus, it passes through the bulb 20 and strikes the ellipsoidal reflector 40 as if it were originally emitted in the opposite direction, and it is then focused on the end of the optical fiber bundle 10.

Figure 2:
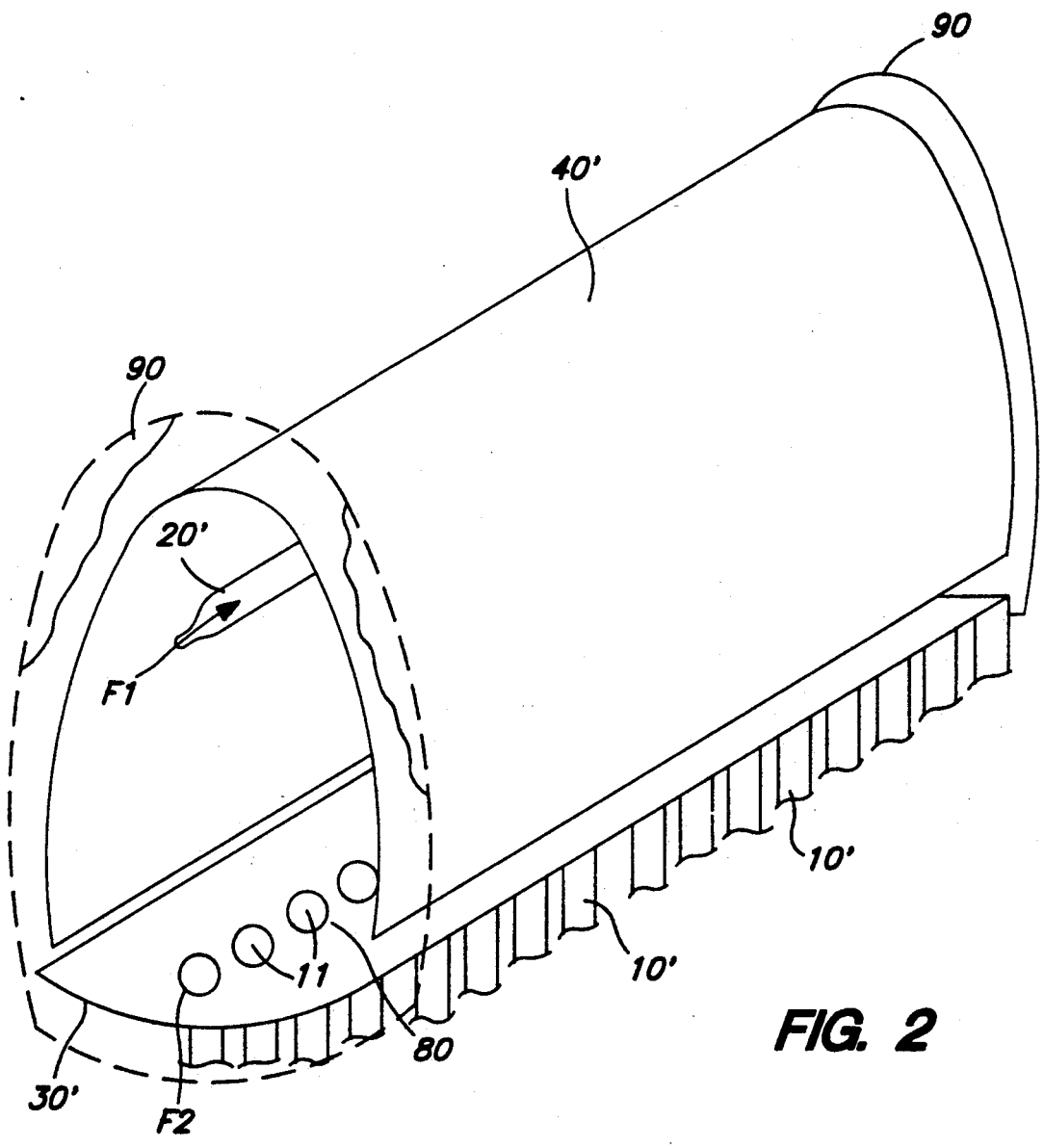
FIG. 2 is a pictorial view of an cylindrical optical system according to this invention.

Referring to FIG. 2, a second embodiment of the invention is depicted. A lamp for coupling radiation into one or more optical fibers or optical fiber bundles 10' is depicted. The lamp comprises a linear radiation source 20', an elliptical cylinder reflector 40', a circular cylinder reflector 30' and planar end reflectors 90. The circular cylinder reflector 30' has a plurality of holes 80 along a central line. The holes may be provided with sockets (not depicted) for securing optical fibers or preferably optical fiber bundles, as described in connection with the first embodiment. The ends 11 of optical fibers 10' will be positioned in the holes 80.

This type of lamp can readily be used as a centralized light, the radiation of which is conducted to separated locations by the optical fibers in the separate holes.

The two reflectors 30', 40' and the radiation source 20' are parallel. The reflectors 30', 40' are set squarely facing each other; the system is symmetrical about the common optical axes of the reflectors if viewed in cross section. The radiation source is located at the focus F1 of the elliptical reflector 40'. The holes 80' in the round cylindrical reflector 30' are located at the second focus F2 of the elliptical reflector 40'. The distance between the first focus and the second focus equals the radius of the round reflector 30'.

Radiation emanating from the source 20' will be incident on one of the two concave reflectors 30',40', or one of the planar reflectors 90. The planar reflectors 90 do not affect focusing; they redirect axially travelling radiation that would leave the system. If radiation is incident on elliptical reflector 40' it will be focused onto the line of optical fiber bundle ends 11. If it is incident on the cylindrical reflector 30' it will be reflected through the bulb 20' to the elliptical reflector 40', which will focus it onto the optical fiber bundle ends 11.

Referring to FIG. 3, a schematic of the optical system of the embodiments depicted in FIG. 2 and FIG. 1 is shown.

The elliptical reflector 40 will be extended to the point that a ray A reflected from the reflector right at the edge 200 will strike the fiber optic bundle end 11 at less than or equal to the maximum acceptance angle for the optical fiber 10. If the elliptical reflector 40 were extended further, rays reflected from the added portion would strike the optical fiber end 11 at an angle greater than the maximum acceptance angle and would not be coupled into it. The maximum extension for a given ellipse size, ellipticity, and bulb size can be determined using geometry or by the use of an accurate drawing.

Other rays as represented by ray B will strike interior portions of the ellipse 40 and also be focused on the fiber end 11. Still other rays represented by ray C will first impinge on the circular reflector 30. Then they will be reflected directly back to the elliptical reflector 40 from which they will be directed to the optical fiber 11.

The elliptical reflector 40 will be extended so far as the extreme ray A reflected off of it is incident on the optical fiber at less than the maximum acceptance angle. The circular reflector 30 will be dimensioned so that the remaining angle of emission not covered by the elliptical reflector 40 will be covered by the circular reflector 30. The ellipticity of the elliptical reflector can be increased so that a greater percentage of the radiation is directly reflected to the optical fiber. However if this is done the shortest distance between the bulb and the reflector is decreased. Since radiation sources are not perfect point sources, the closeness of the reflector results in greater aberration of the rays reflected near the apex. To compensate for this, the overall size of the reflector system may be increased, if practical.

It is preferred that the bulb 20 used be highly transparent to the radiation it emits. A microwave electrodeless bulb as an excitation means type is highly transparent to its own radiation. Discharge bulbs excited in other ways could also be used. For example, inductive or capacitive means could be used, but arrangement of the excitation means without blocking at least a part of the emitted radiation would be problematic. A microwave electrodeless lamp bulb having a mercury-tin halide fill is known to be particularly transparent to its own radiation, and could be advantageously used in this invention.

Figure 4:
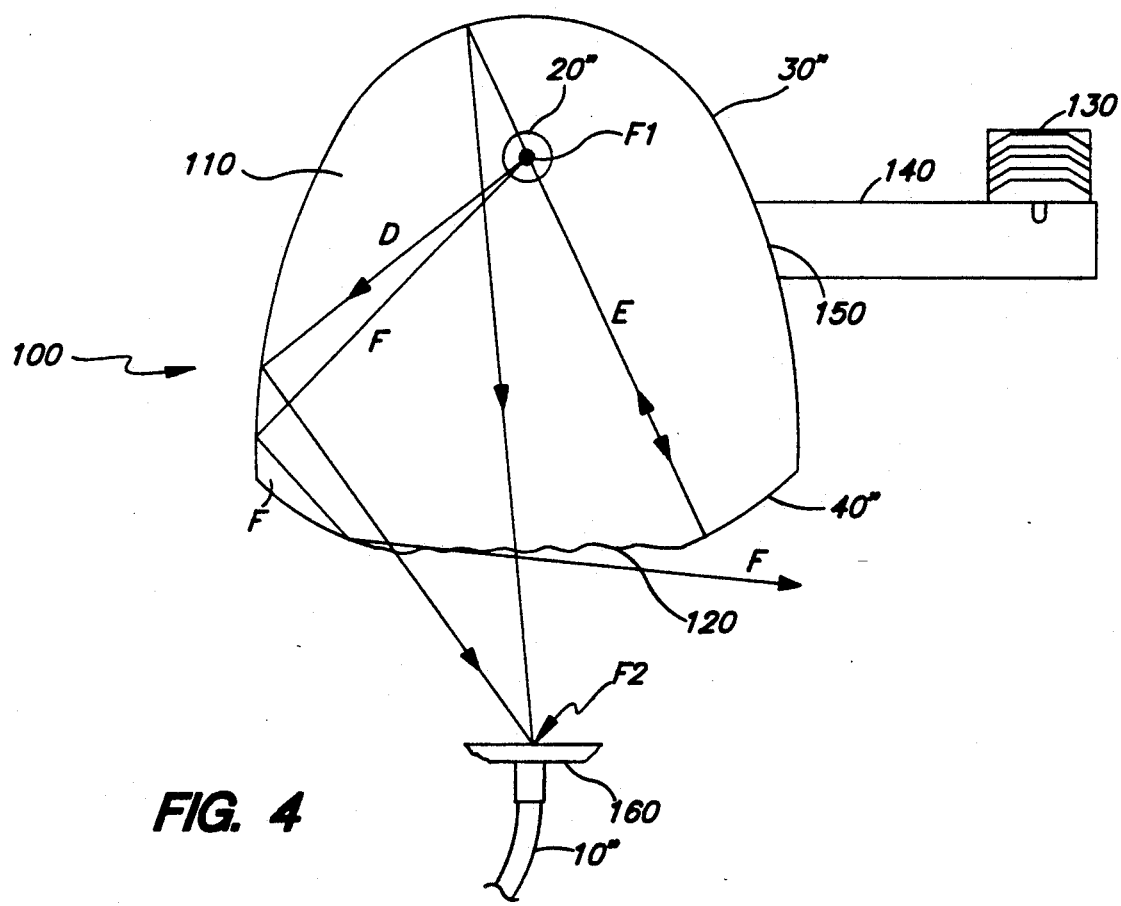
FIG. 4 is a schematic representation of this invention utilized in conjunction with a microwave lamp.

Referring to FIG. 4, a third embodiment of the invention is depicted. In this embodiment, the optical system according to the invention is incorporated into a microwave electrodeless lamp 100.

A microwave cavity 110 is defined by a prolate spheroid reflector section 30", a spherical reflector section 40", and a screen 120 whose wire number and diameter is minimized to allow the passage of light.

The screen 120 and reflector sections 30", 40" are conductive and may be made of tantalum and aluminum respectively. The conductivity is necessary for containment of the microwave field. Microwave energy is produced by a magnetron 130. The microwave energy is channelled via a waveguide 140 to a slot 150 on the cavity wall and into the cavity 110. The slot functions as an antenna, establishing a microwave field in the cavity. A bulb 20" comprised of a quartz hollow containing a plasma forming medium is situated at a first focus F1" of the prolate spheroid reflector which is in the reflector. The plasma forming medium may preferably comprise mercury-tin halide. The microwave field in the cavity drives a discharge of the plasma forming medium which causes it to emit visible light.

The end of the fiber optics is secured by a supporting structure 160 at the second focus F2 of the prolate spheroid reflector, facing the first focus.

Most of the radiation which is emitted so as to be incident on the prolate spheroid reflector is focused on to the end of the optical fiber 10". There is a small portion of the radiation, which is reflected by the prolate spheroid reflector which is diverted from optical fiber by being reflected by the spherical reflector. The former is represented by ray D in the FIG. the latter is represented by ray F.

The spherical reflector is centered on the quartz hollow. Radiation E which directly impinges the spherical reflector is reflected back along its original course through the quartz hollow onto and is in turn focused by the prolate spheroid reflector on to the optical fiber end. A portion of the radiation emitted by the bulb 20' passes directly through the screen 120. Out of that portion a fraction is incident on and coupled into the fiber. A larger fraction is lost. This radiation could be recovered by using an additional larger spherical reflector centered on the bulb.

There thus has been described an optical system for efficiently focussing radiation onto optical fibers. While the invention has been described in connection with preferred embodiments, it should be understood that variations will occur to those skilled in the art, and the invention should be limited only by the claims appended hereto and equivalents.

I claim:

1. An apparatus including a radiation source which emits in a multiplicity of directions for focusing radiation on an object which may receive radiation within a certain solid angle, comprising a first reflector and a second reflector, said first reflectro being elliptical in cross section and having a first focus and a second focus, said first reflector being formed in the shape of a section of a cylinder of an ellipse, said second reflector being circular in cross section and having a center, and a radius equal to the distance between the second reflector and said first focus, said second reflector being formed in the shape of a section of a circular cylinder, said first reflector and said second reflector being arranged so that a concave reflecting surface of said first reflector faces a concave reflecting surface of said second reflector, and so arranged that the first focus of said first reflector corresponds to said center of said second reflector, said radiation source being an elongated discharge bulb which is located at said corresponding center of said second reflector and said focus of said first reflector, and said object being a group of two or more optical fibers defining at least one line of optical fibers which are located at said second focus of said first reflector.

2. An apparatus according to claim 1 wherein the first reflector and the second reflector together cover the entire azimuthal range of angles about the radiation source.

3. An apparatus according to claim 1 wherein one planar reflector covers each end of the elliptical and circular reflector combination.

4. An apparatus according to claim 3 wherein the elliptical reflector, the circular reflector, and the end reflectors cover the entire solid angle about each point of said elongated discharge bulb.

* * * * *